Figure 1:
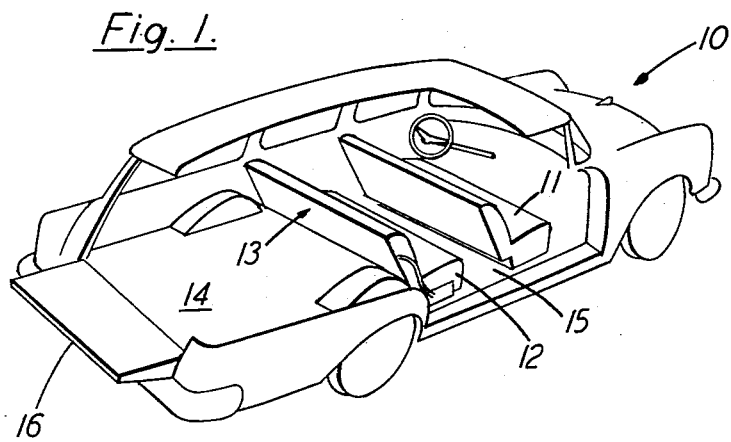

Dec. 5, 1961 V. G. MAY ET AL 3,011,822
FOLDING BACKREST FOR STATION WAGONS
Filed Nov. 19, 1958 2 Sheets-Sheet 1

INVENTORS
VIVIAN G. MAY
CLIFFORD E. HALE

-BY-

ATTORNEY

Dec. 5, 1961 V. G. MAY ET AL 3,011,822
FOLDING BACKREST FOR STATION WAGONS
Filed Nov. 19, 1958 2 Sheets-Sheet 2

INVENTORS
VIVIAN G. MAY
CLIFFORD E. HALE
-BY-

ATTORNEY

United States Patent Office 3,011,822
Patented Dec. 5, 1961

3,011,822
FOLDING BACKREST FOR STATION WAGONS
Vivian G. May, Central Lake, and Clifford E. Hale, Ionia, Mich., assignors, by mesne assignments, to General Motors Corporation, Detroit, Mich., a corporation of Delaware
Filed Nov. 19, 1958, Ser. No. 774,980
7 Claims. (Cl. 296—66)

This invention relates to the construction of folding backrests, and has been developed primarily with reference to the requirements of a type of vehicle commonly known as a "station wagon." This vehicle is commonly called upon to perform services of a passenger carrier and also those of a truck. When used for the latter purpose, the primary consideration is the floor space available at the rear for receiving assorted items of freight. The value of the maximum freight space often outweighs the importance of a rear seat on particular occasions, and it is common practice to fold the rear backrest away from erect position to increase the storage space of the vehicle. This invention provides a mechanism which not only has a very simple and positive movement between folded and erected positions, but also serves as a continuation of the rear floor when in the folded position. The several features of the invention will be analyzed in detail through a discussion of the particular embodiments illustrated in the accompanying drawings. In the drawings:

FIGURE 1 presents a fragmentary view in perspective of a vehicle of the type in which a device embodying this invention would be installed.

Figure 2:
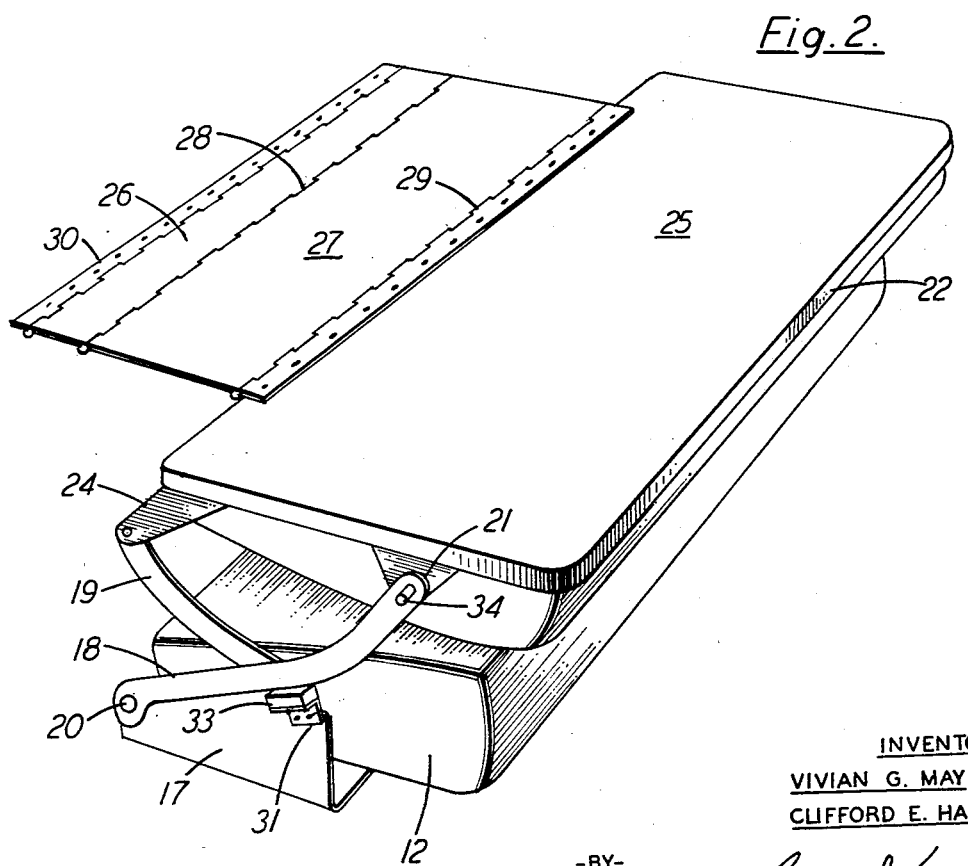

FIGURE 2 is a view on an enlarged scale from that of FIGURE 1, and showing the folding mechanism without reference to the surrounding vehicle structure.

Figure 3:
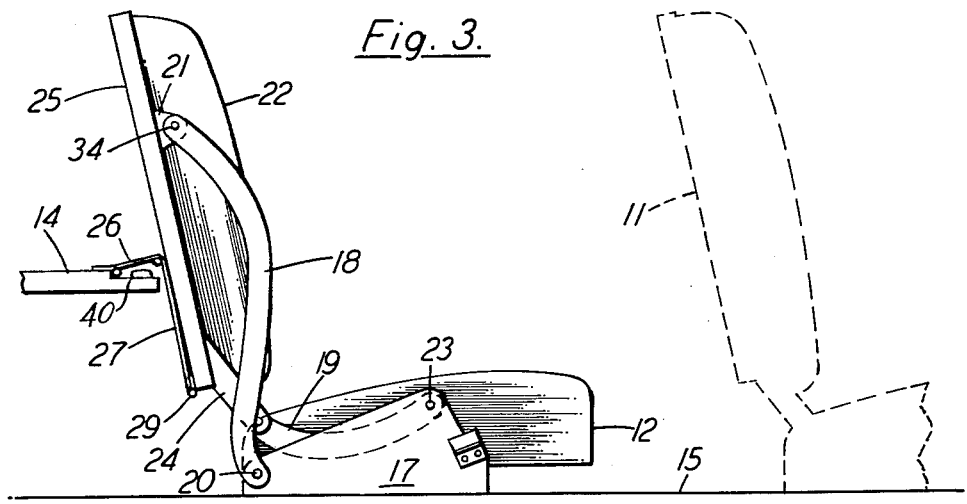
Figure 4:
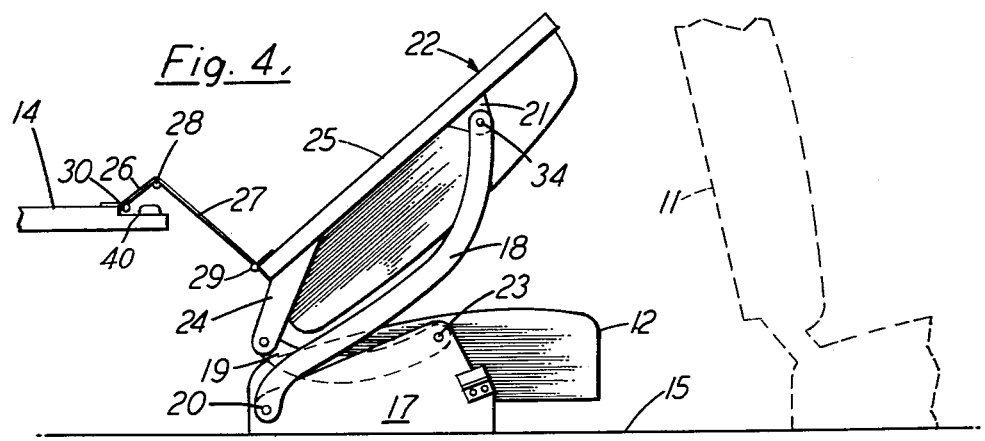
Figure 5:
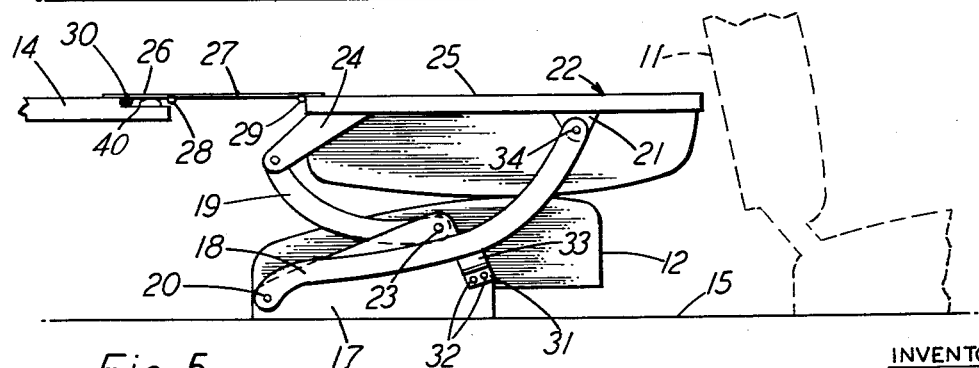

FIGURES 3, 4, and 5 present views in side elevation at successive positions between folding and erected positions of the backrest mechanism.

Referring to the drawings, the station wagon indicated generally at 10 is provided with a fixed front seat-back structure 11 and with the fixed rear seat 12. The folding backrest unit 13 is constructed as shown in the remaining figures of the drawings. The rear floor 14 of the station wagon is normally elevated somewhat above the front floor 15, and an important characteristic of this invention is the fact that the backrest folds over to a position where it forms a continuation of the surface of the rear floor 14, with the backrest superimposed above the fixed seat 12. When in this position, the station wagon is capable of presenting a storage floor which extends from the rear of the tailgate 16 forward to the back of the front seat 11.

Referring to FIGURES 2 through 5, inclusive, a pair of laterally opposite brackets 17 are mounted preferably on the front floor 15 of the station wagon at the opposite sides of the fixed seat 12. These brackets may be integral portions of the body of the vehicle. The primary purpose of these brackets is to provide points of connection for the links 18 and 19. Similar structure is provided at both sides of the vehicle, and will be referred to herein only with reference to the parts on the side visible in the drawings. One end of the link 18 is pivotally connected to the bracket 17 at 20, and the opposite end of the link to the plate 21 which forms a part of the back-supporting member 22. The link 19 is pivotally connected to the bracket 17 at 23, and at the opposite end of the link to the plate 24, which also forms a part of the back-supporting member 22. The relative position of the pivot points of the links is such that the back-supporting member 22 moves from the erected position associated with a conventional backrest over to a position superimposed above the fixed seat unit 12. In this folded position, the rear face 25 assumes a position close to the plane of the rear floor 14. This forward movement and rotation is caused by the positioning of the pivot point 23 in front of and above the pivot point 20, together with the locating of the pivot connection of the link 19 to the back-supporting unit in a position below the pivot connection of the link 18 to the back-supporting unit (with the mechanism in the erect position shown in FIGURE 3).

To form a continuous supporting floor between the back surface 25 and the fixed floor 14, a connection between these members is provided by the panels 26 and 27. A recess 40 is provided in the adjacent portion of the supporting floor to provide a stop for the rear of the panels 26, 27. These panels are hinged together as shown at 28 to form a toggle-like flexibility between the hinge connection 29 to the backrest and the hinge connection 30 to the fixed floor 14. The relative articulation between the panels 26 and 27 provides the flexibility necessary to accommodate the folding movement of the backrest, as best shown in FIGURE 4.

Preferably, a stop is incorporated in the structure which establishes the folded position of the backrest with sufficient positiveness to permit the unit to carry a substantial load without supporting the load on the upholstery of either the fixed seat 12 or of the back-supporting member 22. A simple and preferable arrangement for providing this function is the incorporation of a stop mounted on the brackets 17, and which includes an angle member 31 secured to the bracket with the fastenings 32, and a cushion 33 bonded to the angle member 31. The stop assembly is positioned so that the cushion 33 engages the link 18 to form the necessary support.

In the erected position of the folded backrest, it is also desirable to provide a fixed stop for establishing the final position of the linkage. One possibility for providing this stop is to terminate the forward edge of the fixed floor 14 such that it engages the rear face 25 of the backrest. A preferable arrangement is illustrated in FIGURE 3 wherein the panel 26 is shown to extend substantially at right angles to the backrest face 25 to provide a stop and may include a member 34, which may be in the form of a projecting stud on the pivot means connecting the link 18 to the plate 21, and which engages a conventional catch or latch mounted on the body structure of the station wagon 10. The catch or latch is not shown on the drawings, and may be of any convenient positive or frictional device. The use of such a catch or latch as a stop has the advantage of also maintaining a positive erected position against accidental forward movement of the seat when the vehicle comes to a sudden stop.

The particular embodiments of the present invention which have been illustrated and discussed herein are for illustrative purposes only, and are not to be considered as a limitation upon the scope of the appended claims. In these claims, it is our intent to claim the entire invention disclosed herein, except as we are limited by the prior art.

We claim:
1. In a vehicle body having a seat bottom and a seat back movable from an upright seat-forming position to a folded floor-forming position, a vehicle floor surface spaced above said seat bottom and terminating adjacent said seat back in said seat-forming position and extending outwardly away from said seat back, linkage means pivotally supporting said seat back for movement from said seat-forming position forwardly and downwardly over said seat bottom to said floor-forming position, said seat back having a floor surface formed on the back side thereof and upwardly facing in said floor-forming position, said floor surface being spaced from said vehicle floor surface in said floor-forming position whereat a gap is formed there- between, a plurality of floor-forming panels extending between said vehicle floor and said seat back and comprising, one floor-forming panel pivotally connected to said seat back at the lower end thereof, another floor-forming panel pivotally connected to said vehicle floor, means pivotally connecting said floor-forming panels to accommodate movement thereof from a collapsed position when said seat back is in said seat-forming position to an extended floor-forming position extending from said vehicle floor over said gap to said seat back in said floor-forming position, and said panels forming a continuous surface between said vehicle floor and said seat back in all positions of said seat back and forming a flat continuous extension between said vehicle floor and said seat back in said floor-forming position.

2. The structure as defined in claim 1 and wherein said one floor-forming panel is disposed substantially parallel to said seat back in said seat-forming position, and said other floor-forming panel being positioned and dimensioned to extend from said one floor-forming panel at substantially right angles thereto to form a stop for said seat back in said seat-forming position.

3. The structure as defined in claim 2 and wherein the end of said vehicle floor terminating adjacent said seat back is provided with a recess extending to said gap, a stop provided in said recess to rigidly support said panels in said floor-forming position.

4. The structure as defined in claim 1 and wherein said linkage means comprises, a seat-supporting bracket, said seat bottom being fixed to said bracket, a portion of said bracket extending upwardly in parallel spaced relation to the adjacent side surface of said seat bottom, a first link pivotally connected to said seat back adjacent the upper end thereof, a second link pivotally connected to said seat back adjacent the lower end thereof, a pivotal connection between said first link and said portion of said bracket adjacent the rear end of said seat bottom, another pivotal connection between said second link and said portion of said bracket, said other pivotal connection being spaced upwardly and forwardly of said one pivotal connection, said first link and said second link being pivotally connected to said bracket on opposite sides thereof, and said seat back being movably supported only by said first link and said second link.

5. The structure as defined in claim 4 and having a stop fixed to said portion of said bracket and positioned to engage and support one of the links in said floor-forming position.

6. The structure as defined in claim 5 and wherein said stop comprises an angle member fixed to said portion of said bracket on the same side thereof as said first link, cushion means secured to said stop member, and said cushion means being positioned in the path of movement of said first link from said seat-forming position to said floor-forming position to receive and support said first link in said floor-forming position.

7. The structure as defined in claim 4 and having an elongated plate fixed to said seat back adjacent the lower end thereof and extending downwardly therefrom, and said second link being pivotally connected to the lower end of said elongated plate at a point spaced below the position of said pivotal connection between said first link and said seat back in said folded floor-forming position.

References Cited in the file of this patent
UNITED STATES PATENTS

| 1,609,605 | Buck | Dec. 7, 1926 |
| 2,418,787 | Nelson | Apr. 8, 1947 |
| 2,926,948 | Koplin et al. | Mar. 1, 1960 |
| 2,926,950 | Hooverson | Mar. 1, 1960 |

FOREIGN PATENTS

| 928,506 | Germany | June 2, 1955 |
| 694,578 | Germany | Aug. 3, 1940 |
| 345,908 | Great Britain | Apr. 2, 1931 |
| 628,078 | Great Britain | Aug. 22, 1949 |